United States Patent [19]

Eckert et al.

[11] 3,774,212

[45] Nov. 20, 1973

[54] FREQUENCY MEASURING METHOD FOR A DOPPLER BEACON

[75] Inventors: Klaus-Dieter Eckert, Ludwigsburg; Hans-Joachim Roper, Kornwestheim, both of Germany

[73] Assignee: International Standard Electric Corporation, New York, N.Y.

[22] Filed: Nov. 23, 1970

[21] Appl. No.: 91,649

[30] Foreign Application Priority Data
Nov. 24, 1969 Germany.................. P 19 58 931.2
Nov. 24, 1969 Germany.................. P 19 58 932.3

[52] U.S. Cl............ 343/108 M, 343/106 D, 324/78
[51] Int. Cl............................................. G01s 1/40
[58] Field of Search...................... 343/108 M, 106 D

[56] References Cited
UNITED STATES PATENTS

| | | | |
|---|---|---|---|
| 3,234,554 | 2/1966 | Earp................................ | 343/108 M |
| 3,094,666 | 6/1963 | Smith................................ | 324/78 D |
| 3,524,131 | 8/1970 | McWaid............................ | 324/78 D |
| 3,670,338 | 6/1972 | Earp................................ | 343/108 M |
| 3,290,685 | 12/1966 | Steiner............................ | 343/108 M |

*Primary Examiner*—Benjamin A. Borchelt
*Assistant Examiner*—Denis H. McCabe
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

This invention relates to a method of measuring the elevation angle in cooperation with a Doppler radio beacon. The beacon includes a vertical linear antenna array in which the movement of an individual radiator is simulated with a sawtooth-shaped time function. To determine the Doppler shift of the signals reaching the receiver, the zero crossovers of the sum signal are counted over a beat cycle of the Doppler components. The frequency of the Doppler shift, which is proportional to the sine of the elevation angle, is computed by quotient formation with the respective measuring time.

2 Claims, 4 Drawing Figures

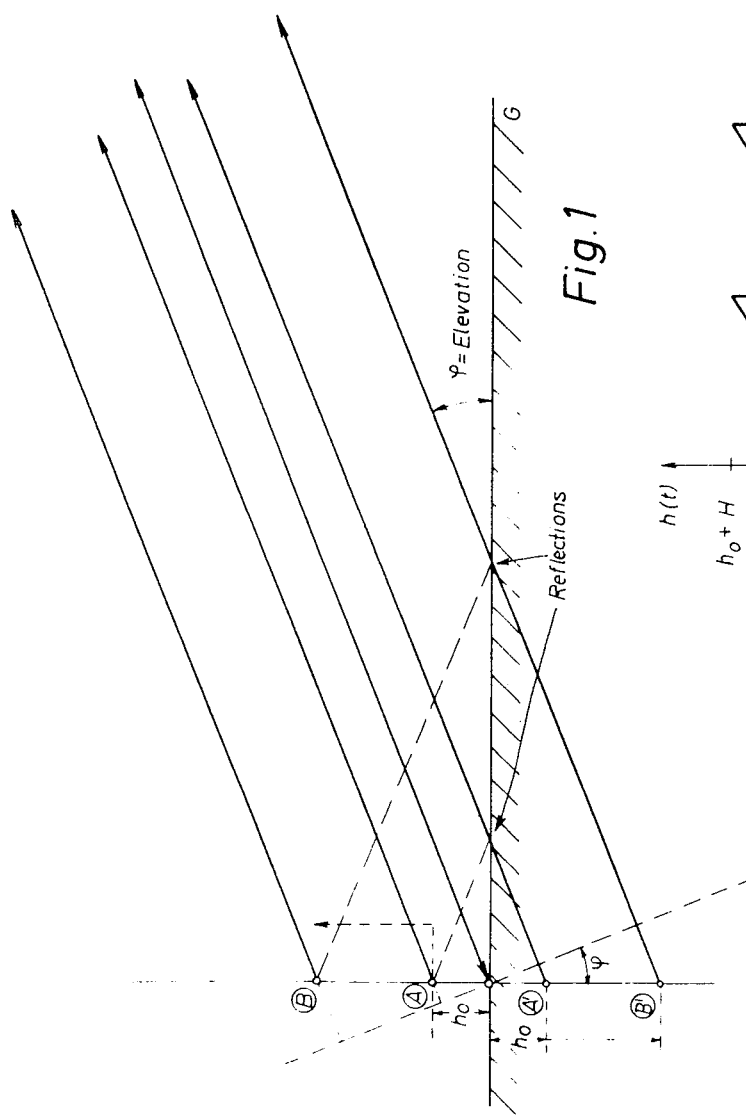
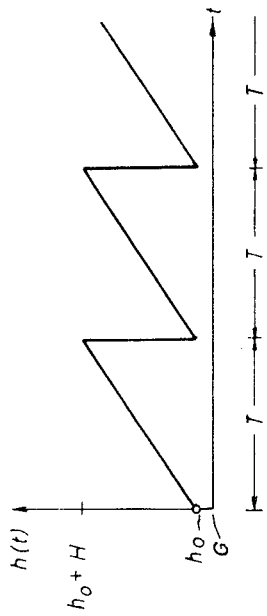

FREQUENCY MEASURING METHOD FOR A DOPPLER BEACON

BACKGROUND OF THE INVENTION

The present invention relates to a method of measuring the elevation angle in airborne equipment in cooperation with a Doppler radio beacon, and more particularly to the on-board evaluation of the radiated signals for glide-path angle information.

It is known to measure the elevation angle in airborne equipment in cooperation with a radio beacon utilizing the Doppler effect, the antenna system of which radio beacon is a vertical linear antenna array and in which the movement of a radio-frequency-fed individual antenna element of said antenna system is actual or simulated. In an embodiment, a radio-frequency wave whose frequency is different from that of the first radio-frequency wave is radiated by a fixed antenna, which may be part of the linear antenna array, for the formation of a beat frequency at the receiving end of for easier evaluation. The onboard determination of the elevation angle is carried out using the direct wave and the waves reflected from the surface of the earth in such a manner that the center frequency of the beat signal is determined as a measure of the elevation angle.

In a radio beacon for elevation measurement, which is designed as described above, two radio-frequency waves actually reach the receiving equipment, mainly a direct wave and a wave reflected from the surface of the earth, which, however, are superposed on one another in the radiation field to form a single sum signal. By the actual or simulated movement of the radiator, both waves are subjected to a Doppler shift. If the movement is carried out to one side only, from low to high, the direct wave is subjected to a positive Doppler shift and the reflected wave to a negative one. The amount of the Doppler shifts are not necessarily equal. If the direction of movement is reversed, the signs of the Doppler shift are naturally reversed, too. In this case, the Doppler shifted radio-frequency wave reaching the receiver directly, i.e. the Doppler frequency, contains the elevation angle directly; the Doppler shift of the reflected waves is only disturbing in the evaluation. If a thus produced radio-frequency signal with two Doppler components is received and demodulated, the sum signal from the superposition of the two Doppler components is obtained as demodulation product and individually, the frequencies of these Doppler components cannot be readily measured. Prior to the frequency measurement, the signal components must be separated.

In known methods, filters are generally used for the separation of signals of different frequency; these filters may be designed as digital or analog filters. If the frequency to be filtered out is variable within a relatively wide band, tunable filters (search filters) or a plurality of individual filters connected in parallel and bordering on each other or overlapping each other in the pass band (filter battery) are used.

Apart from the fact that the filtering method requires a considerable expenditure at the receiving end, it cannot be used in the separation of the Doppler components in cooperation with the above-described radio beacon without additional measures at the transmitting end because the sum signal, due to the antenna movement taking place in one direction, exists as a continuous signal only during short time intervals. As is generally known, during "jumping" from the last to the first individual antenna of the vertical antenna system, phase shiftss (transients) occur in the radiated signal which are so large and make the signal spectrum so complex that it is practically impossible to separate the fundamental components at the receiving end by the conventional method using filters. Another complicating factor is that the frequencies of the two Doppler components are close together and variable within wide limits.

In navigation systems, in which a phase measurement instead of an absolute frequency measurement provide the information, a distinction can be made between direct and reflected waves on the basis of the transit-time differences.

The invention, however, pursues a totally different course for the frequency measurement of the Doppler component containing the elevation angle ($\phi$), in which the amplitude differences of the Doppler components are utilized. The fundamental idea of solution of the invention is based on the recognition that in the absence of a direct-voltage component or offset the number of zero crossovers of a periodic, sinusoidal signal, is not changed if a further signal of smaller amplitude and slightly different frequency (whether of higher or lower frequency) is superimposed on, (i.e. summed with) said periodic signal, and if the sum signal is viewed over a sufficiently long period of time, over a beat cycle of the two signals. In other word and more in accordance with actual practice, a sum signal consisting of the superposition of two components of slightly different frequency and varying in amplitude has just as many zero crossovers as the signal component with the greater amplitude. Although the signal component with the smaller amplitude can noticeably displace the position of the zero crossovers on the time axis (t), the number of crossovers remains the same.

SUMMARY OF THE INVENTION

It is an object of the present invention to provide a method of measuring the frequency of a signal characterized in that the signal is the component with the greatest amplitude of a sum signal having components of slightly different frequency and varying in amplitude.

It is a further object of the present invention to provide a method of measuring the elevation angle in airborne equipment by determining the Doppler shift of a beat frequency in cooperation with a Doppler radio beacon, in which the movement of an individual antenna of a vertical linear antenna array, which movement takes place as a sawtooth-shaped time function and which individual antenna is fed with a first radio frequency is actual or simulated, and in which, for the formation of a beat frequency, a second radio frequency differing from said first radio frequency is radiated by a fixed individual antenna.

According to a broad aspect of the invention there is provided a method of measuring the frequency of the greatest amplitude component of a sum signal having at least two components of different frequency and varying in amplitude, said signal having a variable frequency over a pre-selected range, comprising the steps of counting the number of zero crossovers of said sum signal during a predetermined counting period and dividing said number of zero crossovers by said counting period.

According to a further object of the invention there is provided an improved method of measuring the elevation angle in airborne equipment including a receiver, by determining the Doppler frequency in cooperation with a Doppler radio beacon, wherein the movement of an individual antenna of a vertical linear antenna array corresponding to a sawtooth shaped time function, and wherein Doppler components are transmitted by said beacon and received by said receiver as a sum signal, wherein the improvement comprises the steps of demodulating at said receiver said Doppler signal components received directly or via reflection from the surface of the earth, counting over a period determined by at least one sampling cycle the number of zero crossovers of said sum signal, and dividing the number of zero crossovers counted over said period by said period to determine the Doppler frequency as a measure of the elevation angle.

According to a feature of the invention, the discontinuities are blanked during the counting of the zero crossovers.

The invention will now be explained in more detail with reference to an embodiment thereof, which relates to the on-board measurement of the elevation angle in cooperation with a Doppler radio beacon for elevation measurement with a vertical linear antenna array, and in conjunction with the accompanying schematic drawings in which:

BRIEF DESCRIPTION OF THE DRAWINGS

FIG. 1 shows the geometry of the radio beacon;
FIG. 2 shows the time function of the sequence of movements of the antenna system.

DESCRIPTION OF THE PREFERRED EMBODIMENT

Starting from an altitude $h_o$ over the surface of the earth G, the individual antenna B illustrated in FIG. 1 performs an actual or simulated (by switching or commutation of excitation) movement upwards in a vertical direction at a constant speed up to an altitude $h_o$ + H and radiates a signal of the frequency $f_1$. After the altitude $h_o$ + H is reached, the process is repeated (see FIG. 2). The repetition frequency is $f_8$ (cycle period T). By the upward movement of the individual antenna B, the frequency $f_1$ undergoes a positive Doppler shift $f_D$ due to the path between the individual antenna B and a receiving antenna on board aircraft becoming shorter, so that the received signal (at the aircraft receiver) assumes the frequency $f_1 + f_D$. As the geometrical relations in FIG. 1 show, the Doppler shift $f_D$ depends on the elevation angle $\phi$. The following equation holds:

$f_D = H/\lambda \cdot f_8 \cdot \sin \phi$ where
$\lambda$ = wave length of the carrier (frequency $f_1$),
H = path covered in upward directed,
$f_8$ = frequency of antenna movement,
$\phi$ = elevation angle.

As a result of the reflection of the radiated signal $f_1$ from the surface of the earth, seemingly emanating from the mirror image B', a Doppler shift $-f_{D'}$, occurs, the frequency of which is not necessarily equal to $f_D$. These two radio-frequency signals are superimposed on each other in the radiation field. For their demodulation at the receiving end, a subcarrier of the frequency $f_1 - f_L$ may be sent out by the ground station (ref. antenna A, FIG. 1) or added in the receiver. The demodulated signal then contains only the frequencies $f_L + f_D$ and $f_L - f_{D'}$.

If the direction of movement is reversed (from high to low), the signs of the Doppler shifts are naturally reversed, too.

Since the reflection from the ground is attenuated the amplitude of the signal with the frequency $f_{D'}$ is always smaller than that of the signal with the frequency $f_D$.

However, these considerations would apply without reservation only if the upward movement of the individual antenna B could continue for an infinitely long period of time. At the time of the already mentioned "jumps" or retraces from the altitude $h_o$ + H to the altitude $h_o$, additional discontinuities are obtained at these points in the signal waveform. Those discontinuities as will be explained later, are blanked by known digital means when the zero crossovers are counted.

Figure 3:
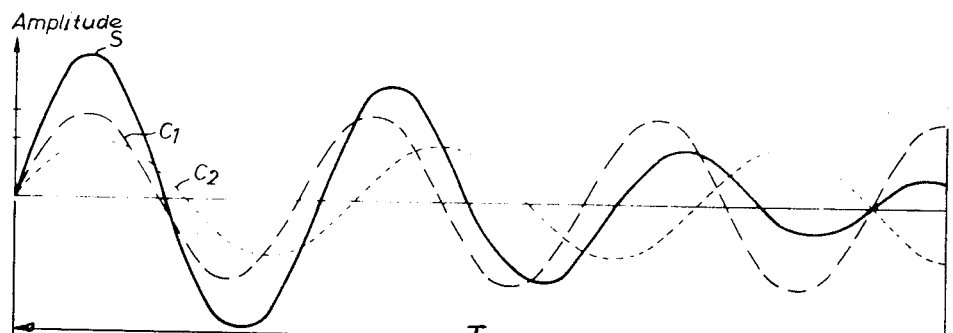
FIG. 3 shows the low-frequency sum signal and its components.

FIG. 3 shows the sum signal S, obtained by demodulation, with its components $C_1$ and $C_2$ which correspond to the Doppler components $f_D$ and $-f_{D'}$, respectively, plotted against the time period T for a single sawtooth cycle. In the representation according to FIG. 3, the component with the greater amplitude $C_1$ has, in accordance with the upward movement of the individual antenna B, the higher frequency component $C_1$ could, in accordance with a downward movement of the individual antenna B, also have the lower frequency without its frequency measurement being adversely effected. From FIG. 3 it can be seen that the sum signal consisting of the superposition of the signal components $C_1$ and $C_2$ has just as many zero crossovers as the greater amplitude component $C_1$. Thus, if the zeros of the sum signal S are counted over a sufficiently long time, the frequency is obtained with sufficient accuracy after a quotient operation (number of zero crossovers divided by the measuring time corresponding thereto). A single beat cycle of the signal components $C_1$ and $C_2$ may be regarded as an optimum or typical measuring time (not the same as T).

Since the measuring time extends over several sawtooth cycles (continuity cycles), it is necessary to separately count the zero crossovers of the sum signal S over several sawtooth cycles and determine the measuring time as well as to subsequently take the means in such a manner that only the partial measured values being obtained in the individual continuity cycles, i.e. the number of zero crossovers and the measuring times belonging thereto, are added, and that the value for one cycle or the frequency is determined by quotient formation between the sum values.

In order to be able to carry out the summation of the partial measured values obtained within each continuity cycle, it is necessary to suppress the spectral lines created by the phase shifts (transients) during the switch-over from the highest to the lowest individual radiator of the antenna system. Such transient spectral lines cause unwanted signal zero crossovers as hereinabove indicated. Therefore, the discontinuities must be blanked. To this end, the moment of the occurance of the discontinuities must be known at the place of evaluation. In a radio beacon of the kind being considered here, this can be accomplished in a simple manner by causing said radio beacon to transmit special identification signals consisting, for example, of a coded pulse group at the beginning or end of each sawtooth cycle (T).

If the method being described is to be compatible with a known navigation method for the coarse and fine measurement of the azimuth with respect to the radiations of a similar radio beacon antenna, the switch-over instant of the antenna system can be marked on board the aircraft in a simple manner by using the coarse reference signal for the azimuth measurement. The latter is typically 15Hz and is sent out by the ground station, as an identification signal for the switch-over periods. Synchronization at the sending end of the time sequence of the simulated movement of the individual radiator B according to FIG. 2 with the coarse reference signal is also required. The frequency of the fine reference signals (135 Hz) may then be chosen as $f_L$.

However, in order to obtain measurement results as accurate as possible, it is appropriate that the periodicity of the discontinuities (in the Doppler radio beacon = sawtooth cycle) and the periodicity of the sum signal S (FIG. 3) are not harmonically related from the beginning. This means that the frequencies $f_L$ and $f_s$ are not harmonically related from the beginning, i.e. their smallest common mutiple is to be as large as possible.

Figure 4:
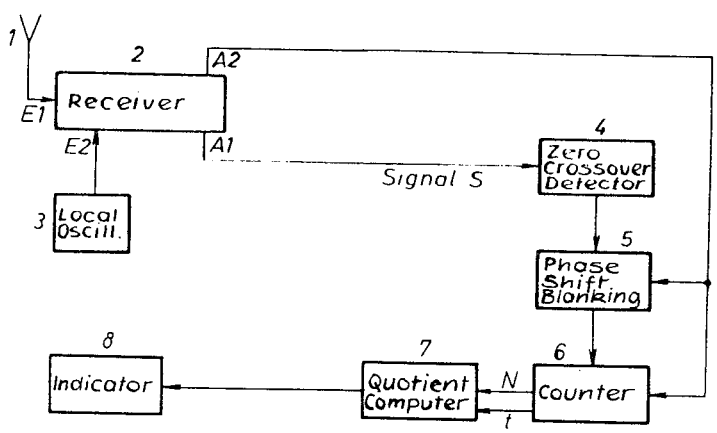
FIG. 4 shows the evaluating method in rough outlines.

In FIG. 4, an embodiment of an evaluating circuit is illustrated as a block diagram. Applied to an input terminal $E_1$ of a receiver 2, which also contains the demodulator, is the input signal of the frequencies $f_1 + f_D$ and $f_1 - f_{D'}$ received by an antenna 1. If the signal $f_1 - f_L$ cannot be taken from the radiation field and is not already applied to the input $E_1$ together with the other signals, it may be fed from a local oscillator 3 to the receiver 2 at a second input terminal $E_2$, with the value for $f_L$ having to be kept constant in known manner with respect to the frequency. The signals $f_L + f_D$ and $f_L - f_{D'}$ appear as sum signal S with the components $C_1$ and $C_2$ at a first output $A_1$ of the receiver 2 (FIG. 3) and the identification signals for the phase shifts appear at a second output $A_2$. The sum signal S is applied to a zero crossover detector 4, and its output signal is fed into a counter arrangement 6 via a circuit 5 for phase shift blanking. The identification signals are applied to a second input of the circuit 5 for phase shift blanking and to the counter arrangement 6. At one output, the counter arrangement 6 supplies the number N of zero crossovers and, at a second output, the time $t$ belonging thereto, perhaps already summed up over several continuity cycles. From these two values, either the cycle or the frequency or both values are computed in a quotient computer 7. The measurement result is displayed by means of an indicating device 8 on whose dial the value for the frequency $f_D$ of the component $C_1$ with the greater amplitude can be read, taking into account the frequency $f_L$. Superposition of an appropriate scale makes it possible to indicate the elevation angle directly.

While the principles of the invention have been described in connection with specific apparatus, it is to be clearly understood that this description is made only by way of example and not as a limitation to the scope of my invention set forth in the accompanying claims.

I claim:

1. An improved method of measuring the elevation angle in airborne equipment including a receiver by determining the Doppler frequency in cooperation with a Doppler radio beacon, wherein the movement of an individual antenna of a vertical linear antenna array corresponding to a sawtooth-shaped time function, and wherein Doppler components are transmitted by said beacon and received by said receiver as a sum signal, wherein the improvement comprises the steps of:

demodulating at said receiver said Doppler signal including components received directly and via reflection from the surface of the earth;

counting over a period determined by at least one sampling cycle the number of zero crossovers of said sum signal; and dividing the number of zero crossovers counted over said period by said period to determine the Doppler frequency as a measure of the elevation angle.

2. In an electronic air navigation system including a Doppler ground beacon transmitting a carrier exhibiting a simulated Doppler modulation resulting from programmed cyclical excitation of a vertical antenna array one element at a time, and airborne receiving means for on-board derivation of a received Doppler signal representative of elevation angle, apparatus comprising:

first means within said airborne subsystem for receiving and demodulating a signal composed of the sum of the direct signal from said ground beacon and a ground-reflected signal from said beacon;

second means responsive to said first means for counting the zero amplitude crossovers of said demodulated sum signal over at least one cycle of said cyclical excitation of said vertical array;

third means including a divider for dividing said count by the time over which said counting is effected to provide a quotient signal which is a function of said received Doppler signal.

* * * * *